United States Patent
Thannhuber

(10) Patent No.: US 11,050,265 B2
(45) Date of Patent: Jun. 29, 2021

(54) SYSTEM AND METHOD FOR MONITORING AND REMOTE CONTROLLING THE CHARGE STATE OF AT LEAST ONE BATTERY PACK

(71) Applicant: Einhell Germany AG, Landau/Isar (DE)

(72) Inventor: Markus Thannhuber, Landau (DE)

(73) Assignee: Einhell Germany AG, Landau/Isar (DE)

( * ) Notice: Subject to any disclaimer, the term of this patent is extended or adjusted under 35 U.S.C. 154(b) by 0 days.

(21) Appl. No.: 16/649,849

(22) PCT Filed: Sep. 25, 2018

(86) PCT No.: PCT/EP2018/075957
§ 371 (c)(1),
(2) Date: Mar. 23, 2020

(87) PCT Pub. No.: WO2019/063541
PCT Pub. Date: Apr. 4, 2019

(65) Prior Publication Data
US 2020/0389036 A1    Dec. 10, 2020

(30) Foreign Application Priority Data

Sep. 29, 2017 (DE) ............. 10 2017 122 734.2

(51) Int. Cl.
| | |
|---|---|
| *H02J 7/00* | (2006.01) |
| *G06F 3/0484* | (2013.01) |
| *G08C 17/02* | (2006.01) |
| *H04Q 9/00* | (2006.01) |

(52) U.S. Cl.
CPC ........ *H02J 7/00032* (2020.01); *G06F 3/0484* (2013.01); *G08C 17/02* (2013.01); *H02J 7/0013* (2013.01); *H02J 7/0048* (2020.01); *H04Q 9/00* (2013.01); *G08C 2201/51* (2013.01); *G08C 2201/93* (2013.01); *H04Q 2209/43* (2013.01)

(58) Field of Classification Search
None
See application file for complete search history.

(56) References Cited

U.S. PATENT DOCUMENTS

| | | | | |
|---|---|---|---|---|
| 2010/0211643 | A1* | 8/2010 | Lowenthal | B60L 53/64 709/206 |
| 2011/0077809 | A1* | 3/2011 | Leary | B60L 53/65 701/22 |
| 2013/0110296 | A1* | 5/2013 | Khoo | G06Q 10/1093 700/286 |
| 2015/0372518 | A1 | 12/2015 | Toya et al. | |
| 2016/0046199 | A1 | 2/2016 | Butler et al. | |

FOREIGN PATENT DOCUMENTS

| | | |
|---|---|---|
| CN | 106161489 A | 11/2016 |
| CN | 106960556 A | 7/2017 |
| DE | 102016012996 A1 | 5/2018 |
| EP | 3252554 A1 | 12/2017 |

OTHER PUBLICATIONS

PCT; App. No. PCT/EP2018/075957; International Search Report and Written Opinion dated Jan. 10, 2019.
Kostic, V., and R. Janke. "Die Zukunft hat mit LoRa begonnen—Low-Power-Netze für das Internet der Dinge." NET 9 (2016): 22-25.
CIPO; App. No. 3,075,328; Examination Report dated Feb. 25, 2021.

* cited by examiner

*Primary Examiner* — Arun C Williams
(74) *Attorney, Agent, or Firm* — Fitch, Even, Tabin & Flannery LLP

(57) ABSTRACT

The invention relates to a system for monitoring and remote controlling the charge state of at least one battery pack comprising the at least one battery pack for an electric device which has a communication device that is designed to transmit charge state data of the battery pack to a server device of the system. The server device is designed to transmit the charge state data to at least one user interface of the system, wherein the user interface is designed to visualize the charge state data of the battery pack, and the user interface is additionally designed to transmit control data for actuating a charging device to the server device depending on a user input. The server device is designed to transmit the control data to the communication device, which is integrated into the battery pack, said communication device being designed to transmit the control data for a charging process of the battery pack to the charging device. The invention additionally relates to a method for monitoring and remote controlling the charge state of at least one battery pack.

15 Claims, No Drawings

SYSTEM AND METHOD FOR MONITORING AND REMOTE CONTROLLING THE CHARGE STATE OF AT LEAST ONE BATTERY PACK

The present invention relates to a system and a method for monitoring and remotely controlling a state of charge of at least one battery pack.

Despite of all of the advantages, battery-operated electrical appliances have a very crucial disadvantage with respect to wired electrical appliances in the form of the limited battery operating time and battery capacity, respectively, in combination with the usually relatively long charging times. In particular, the availability of the electrical appliances is a crucial aspect for users of such battery-operated electrical appliances. While the tank of a gasoline-operated appliance can be filled within shortest time, thus, a 5.2 ampere-hour battery for example first has to be in a charging cradle for circa two hours until it is completely charged.

One can assume that batteries are stored completely discharged in the rarest cases. But even with a residual charge of for example 50 percent, one can usually assume that a battery-operated lawn mower with such a battery for example can no longer be used to completely mow a conventionally large lawn area. If the concerned battery is then again completely charged or at least sufficiently charged, the sun is possibly already set. Certain technical, physical and cost-related limits are simply set to any increase of battery capacities and battery operating times associated therewith, respectively.

It is the object of the present invention to provide a solution, by means of which the availability of battery-operated electrical appliances can be increased.

This object is solved by a system as well as by a method for monitoring and remotely controlling a state of charge of at least one battery pack comprising the features of the independent claims. Advantageous configurations with convenient and non-trivial developments of the invention are specified in the dependent claims.

The system according to the invention for monitoring and remotely controlling a state of charge of at least one battery pack comprises the at least one battery pack for an electrical appliance. The battery pack comprises a communication device, which is configured to transfer state of charge data of the battery pack to a server device of the system, which server device is configured to transfer the state of charge data to at least one user interface of the system. The user interface is configured to visualize the state of charge data of the battery pack. In addition, the user interface is configured to transfer control data for controlling a charging device to the server device depending on a user input performed at the user interface. The server device is in turn configured to transfer the control data to the communication device integrated in the battery pack. The communication device integrated in the battery pack is in turn configured to transfer the control data for a charging operation of the battery pack to the charging device.

According to the invention, it can alternatively also be provided that a system for monitoring and remotely controlling a state of charge of at least one battery pack comprises the at least one battery pack for an electrical appliance, which battery pack comprises a communication device, which is configured to transfer state of charge data of the battery pack to a server device of the system. In this case, the remaining features mentioned above can also be of purely optional character. Thus, in the simplest case, it is sufficient if the state of charge data gets up to the server and the system is at least configured thereto.

The battery pack itself preferably includes a package of multiple battery cells connected to each other, which are for example constructed on lithium ion basis. However, other battery types are also possible. Preferably, the battery cells of the battery pack are connected to the communication device of the battery pack for energy supply. If the battery cells are not depleted—it can thereby be anytime ensured that the communication device of the battery pack can be supplied with energy such that a permanent data transfer between the server device and the communication device can be ensured.

The system according to the invention is based on the realization that the operating time of a battery-operated electrical appliance itself often is not really the crucial factor for users. A much more crucial aspect for many users is simply the availability of a battery-operated electrical appliance at a certain point of time. The system according to the invention makes a contribution not even to let users get into a situation, in which they are faced with discharged batteries.

On the one hand, this is achieved in that the communication device integrated in the battery pack can preferably continuously transfer state of charge data of the battery pack to the server device of the system, wherein the server device in turn can transfer this state of charge data to the at least one user interface of the system. Based on the user interface configured to visualize the state of charge data, a user can recognize at any locations and thus arbitrarily far away from the concerned battery pack how fully the battery pack is currently charged. Moreover, the system according to the invention offers the possibility of remote control of the said charging device.

If the user recognizes based on the user interface that the battery pack, which he for example wants to employ in an electrical lawn mower in some hours, does not have the required state of charge to for example completely mow his lawn, thus, he can perform a corresponding input via the user interface as a result of which the user interface can generate the said control data for controlling the charging device and transfer it to the server device. From the server device, this control data for controlling the charging device in turn get to the communication device of the battery pack, which battery pack is configured to transfer the control data to the charging device during the charging operation.

On the one hand, it is thus possible in simple manner for a user by means of the system according to the invention to schedule his works, in which the battery pack is required, and the charging operations required thereto in forward-looking manner. On the other hand, he can additionally also remotely charge the battery pack in time by the remote controllability of the charging device without having to be on site thereto. Thereto, the battery pack has to be inserted into the charging device or be arranged in corresponding vicinity of the charging device in case of an inductive charging device, but starting and terminating the charging operation can be very simply remotely controlled via the user interface. Therein, it is not required that the user has to be in the vicinity of the charging device to remove the battery pack from the charging device when it is completely charged to protect it from overcharging. Because just as well as the user can activate the charging device via the user interface, he can also again remotely deactivate the charging device when he recognizes via the user interface that the concerned battery pack has been completely charged or at least charged as far as the user desires.

Therein, the communication device integrated in the battery pack forms the pivot of this monitoring and remote control functions. On the one hand, it is possible via this communication device that data relating to the battery pack, in particular the state of charge data of the battery pack, can get up to the user interface via the server device, wherein the battery pack also serves as a type of access point on the other hand, via which the remote control of the charging device can be effected. Therein, the communication device of the battery pack is correspondingly designed and configured to establish a data link with the charging device. In the simplest case, this data link can be effected wired, wherein a wireless link is of course alternatively or additionally also possible.

Preferably, the communication device of the battery pack is configured to maintain a permanent data link between the charging device and the server device, preferably via an Internet link. Thus, the system according to the invention entails the advantage that a user can be informed about the state of charge of the battery pack at any time on the one hand, wherein the user can additionally also initiate a remote control of a charging operation of the battery pack on the other hand. Hereby, the user is optimally assisted in being able to ensure availability of the battery pack for very different works and fields of employment.

In addition, the system according to the invention can also be configured such that it comprises one or more plugins for very different apps. Thus, the user interface can for example be integrable in an app in the form of such a plugin. Currently, the app WeChat is for example very widespread, especially among Chinese-speaking persons. For example, the system according to the invention could offer a plugin for such an app. Enabled services and functions can then be integrated in such an app via the plugin by the system according to the invention. Of course, it is also possible that a separate app is additionally or alternatively offered for the system.

An advantageous embodiment provides that the communication device of the battery pack is configured to transmit the data to the server device via a Low Power Wide Area Network and to receive the data from it. Preferably, the communication device is configured to use at least one of the following standards or technologies for transmitting and receiving the data via the Low Power Wide Area Network:
  LoRaWAN;
  Symphony Link;
  LTE-M;
  NarrowBand-IoT;
  Weightless-N;
  Weightless-P;
  Weightless-W;
  Wi-Fi HaLow;
  WavIoT NarrowBand Fidelity;
  SigFox;
  Random Phase Multiple Access.

Thereto, the communication device for example includes a radio module, which is configured to transmit and receive the said data via a Low Power Wide Area Network. With respect to the reception and transmission of data, thus, the communication device is virtually independent of range. Basically, the physical link between various terminals like the battery pack and further terminals can occur via license-free frequencies of the radio spectrum or mobile radio frequencies, wherein the link between gateways and network servers can for example be effected via IP links.

A further advantageous embodiment of the invention provides that the communication device is additionally configured to transmit and/or receive the above mentioned data and/or other data via a Wireless Local Area Network and/or via a Bluetooth link. Preferably, the communication device comprises radio modules correspondingly configured thereto, for example a WLAN radio module and/or a Bluetooth radio module.

For example, if the battery pack should be used in the range of a home network, thus, the communication device of the battery pack can dial in the home network. Using such a Wireless Local Area Network, large data amounts can be received and transmitted in simple manner and especially also in fast manner. Thus, for example in a home network, a software update for the battery pack or the concerned electrical appliance can be downloaded and installed by means of the battery pack via the WLAN without problem. Thus, the battery pack serves as an access point for a Cloud-based update in this case. Preferably, the battery pack is configured to perform a viral update of a respective firmware of the battery pack or the electrical appliance, in which the battery pack is inserted. Thereto, the battery pack, preferably the communication device of the battery pack, is configured to examine if the firmware installed on it and the firmware installed on the electrical appliance are in the same version status, e.g. as soon as the battery pack has been inserted into the electrical appliance. The communication between battery pack and electrical appliance is preferably effected via a bus system of the electrical appliance and/or the battery pack. The battery pack is configured to automatically download a new firmware for the battery pack from a Cloud if the firmware of the battery pack should have an older version status than in the electrical appliance. In addition, the battery pack is configured to automatically download a new firmware for the electrical appliance from a Cloud if the firmware of the electrical appliance should have an older version status than in the battery pack. Thus, in the common use, the battery pack and the electrical appliance virtually always infect each other with respect to the more current firmware. For example, the charging device can also be understood by the electrical appliance. Thereby, it can be ensured that the battery pack and the electrical appliance are operated in the same software status. As a result, the newest functions both in the battery pack and in the electrical appliance can always be used and the correct communication between battery pack and electrical appliance can be ensured.

In further advantageous configuration of the invention, it is provided that the communication device of the battery pack is configured to transfer state data with respect to a temperature of the battery pack, error memory entries of the battery pack and/or a state of health of the battery pack to the server device, which server device is configured to transfer the state data to the user interface, which user interface is configured to visualize the data. Thus, a user of the battery pack can permanently view all of the relevant data and parameters with respect to the state of the battery pack also in remote manner. If required or at least desired by him, he can thus for example also remotely correspondingly act on the charging operation in controlling manner, for example if he should recognize that the temperature of the battery pack was too high, certain errors occur at the battery pack and the like. Upon demand, the user can thus for example simply terminate a charging operation. Moreover, he can also remotely monitor at any time in what situation the battery pack is per se or if the state of health of the battery pack is critical or if other errors also have occurred. This also contributes to increase the availability of the battery pack.

In further advantageous configuration of the invention, it is provided that the server device is configured to transfer a request for charging the battery pack to a user interface depending on the state of charge data of the battery pack and/or the state data, which user interface is configured to visualize this request Thus, the system is preferably configured to assist a user in timely scheduling and performing charging operations. For example, if it is registered in the server device related to person that a certain person uses the battery pack or also further battery packs for certain types of gardening tools, such as for example for a lawn mower among other things, thus, weather data can be incorporated to automatically ascertain when the best time for lawn mowing would be. Alternatively or additionally, date entries of the concerned person in his electronic diary can for example also be examined to match them to the weather forecast such that a possible date can also be automatically proposed, at which the person would still have time to mow the lawn in optimum weather conditions. In particular in combination with the state of charge data of the battery pack and optionally also in combination with the state data of the battery pack, thus, the server device can provide optimum assistance to inform the concerned person via the user interface, for example via a push notification, when a charging operation of the concerned battery pack or also multiple battery packs should be started. This also contributes to considerably increase the availability of the battery pack. In addition, it is also possible to recognize based on diary entries that the concerned person for example will not be at home at all the next four. For example, in such a case, a charge level of the battery pack, thus the SOC, can e.g. be decreased to 40%. Thereby, the ageing of the battery pack can be reduced.

A further advantageous embodiment of the invention provides that the user interface is formed in the form of an app for a mobile terminal, in particular for a smart phone and/or for a tablet computer. Thus, users can for example very simply use their smart phone mostly carried along anyway to monitor the state of charge of battery packs and to remotely control charging operations. Similarly, it is very conveniently possible for example via a tablet computer to use the said user interface. The user interface or also a further user interface can also be formed in the form of a graphical user interface for a web browser. This entails the advantage that the user interface can be used independently of appliances. Thus, a person can dial at any computer for example via the respective web browser and use the user interface for monitoring and remotely controlling the state of charge of the battery pack. For example, this can be effected via a login and the input of a corresponding password on an operator page of a company in a manner known per se, which provides the system as such.

According to a further advantageous embodiment of the invention, it is provided that the communication device is configured to transfer data with respect to a remaining charging time of the battery pack to the server device, which is configured to transfer the data to the user interface, which is configured to visualize the remaining charging time based on the data. Thus, it can be viewed in very simple manner via the user interface how much time will still elapse until the battery pack is fully charged. For technically interested users, information about a charging current or other charging parameters can for example also be additionally transferred and displayed. In particular in knowledge of the remaining charging time of the battery pack, a concerned person can schedule possible further dates such that he arrives exactly in time at the charging device when the battery pack is fully charged. For example, if multiple battery packs belong to the system, the person can thus use one or more battery packs in certain electrical appliances in simple manner, for example in a battery-operated lawn mower, a battery-operated hedge clipper or the like. At the same time, he can view when another battery pack, which is currently inserted in the charging device, will be completely charged, via the user interface, for example via an app on his smart phone. Thus, it is for example conveniently possible to perfectly schedule the works in garden works or also in other activities such that it can be worked as uninterrupted as possible since the user has anytime knowledge of the fact when certain battery packs will be completely charged.

In further advantageous configuration of the invention, it is provided that the communication device is configured to transfer occupancy data with respect to an occupancy of the charging device to the server device, which is configured to visualize based on the occupancy data how many battery packs are arranged in the charging device. If the charging device comprises a plurality of plug-in slots for a plurality of battery packs, thus, it can be advantageous if a user can view at any time how many of his battery packs are currently arranged in his charging device. This facilitates the search for battery packs and also contributes to increase the availability of the respective battery packs.

In further advantageous configuration of the invention, it is provided that the communication device is configured to transfer data with respect to a remaining operating time of the battery pack to the server device, which is configured to transfer the data to the user interface, which is configured to visualize the remaining operating time based on the data. Thus, a user can also remotely recognize in simple manner, how the situation of a remaining operating time of the battery pack is. For determining the remaining operating time, it can for example be taken into account, in which electrical appliances the battery pack is possibly employed. In this context, it is preferably also possible that different remaining operating times of the battery pack are displayed according to the fact, in which type of electrical appliances the battery pack is employed. For example, for those electrical appliances, which the user possesses, it can be displayed how the situation of the respectively remaining operating times of the battery pack is. Thus, a user can for example recognize that a certain operating time would still be possible for lawn mowing using the battery pack, wherein it can additionally be displayed that in using the battery pack for operating a battery-operated drilling machine, a very different operating time would for example be available and the like. According to the fact for what the user wants to employ his battery pack later, he can decide himself based on the remaining operating time whether or not he should charge the battery pack at all.

A further advantageous embodiment of the invention provides that the server device is configured to transfer control data for discharging and charging the battery pack to the communication device integrated in the battery pack according to a presettable schedule, which communication device is configured to transfer the control data for a discharging and charging operation of the battery pack to the charging device. This entails the advantage that the charging device can for example also be used as a permanent storage possibility for one or also more battery packs. By the automatic, cyclic discharge and charge of the concerned battery packs, the lifetime and the performance of the battery packs can optionally be increased. If the battery packs should for example be mainly used in electrical gardening tools, thus, the battery packs could simply remain in the charging device over the winter even with longer non-use. In this case, the server device would ensure that an automated remote control for discharging and charging the battery packs is effected such that the lifetime of the battery packs can thereby optionally be increased. Now, if the battery packs are again used in spring, thus, it can be ensured that they have a state as optimum as possible especially with regard to their state of health. Thereby, the availability of one or also more battery packs of the system can also be increased. In particular, a charge level of one or more battery packs can also be reduced to a lower level, e.g. to 40% of SOC, by means of the charging device to reduce the calendric ageing, while the battery packs are not used anyway for longer time. The server device is correspondingly configured to generate suitable control data and to transfer it to the charging device via the communication device integrated in the battery pack. The at least one battery pack can also be configured to receive information from the charging device and to transfer it to the server device.

According to a further advantageous embodiment of the invention, it is provided that the server device is configured to transfer the state of charge data to a communication device of a further battery pack, which is configured to visualize the state of charge data, in particular to display if the other battery pack is fully charged. Alternatively or additionally, the further battery pack can also be configured to emit sounds and/or to output haptic feedback depending on the state of charge data. If the further battery pack is for example employed in a gardening tool, thus, the user can recognize if the other battery pack inserted in the charging device is already fully charged or how the situation of the state of charge is, during works with this gardening tool. For example in garden works, it is thus not required that a user has to have a look to the user interface, e.g. at his smart phone or the like. Instead, during the works with an electrical appliance, in which he has employed the further battery pack, he can very simply read on it when the other battery pack, which is currently charged, is completely charged.

The charging device according to the invention is configured to cooperate with the system according to the invention or an advantageous embodiment of the system according to the invention, wherein the charging device comprises a control, which is configured to receive the control data from the communication device of the battery pack and to control a charging operation depending on the control data. Moreover, the control of the charging device is also formed to receive and to correspondingly process all of the other data mentioned above.

The method according to the invention for monitoring and remotely controlling a state of charge of at least one battery pack is effected by means of the system according to the invention or by means of an advantageous embodiment of the system according to the invention, wherein the communication device transfers state of charge data of the battery pack to the server device, which server device transfers the state of charge data to the user interface, which visualizes the state of charge data of the battery pack.

Furthermore, the user interface transfers control data for controlling the charging device to the server device depending on a user input, which server device transfers the control data to the communication device integrated in the battery pack, which communication device transfers the control data for a charging operation of the battery pack to the charging device. Advantageous configurations of the system according to the invention are to be regarded as advantageous configurations of the method according to the invention and vice versa, wherein the system in particular comprises means for performing the method steps.

Further advantages, features and details of the invention are apparent from the following description of preferred embodiments as well based on the drawing. The features and feature combinations mentioned above in the description as well as the features and feature combinations shown below in the description of FIGURE and/or in the FIGURE alone are usable not only in the respectively specified combination, but also in other combinations or alone without departing from the scope of the invention.

The drawing shows in the single FIGURE a severely schematized representation of a system for monitoring and remotely controlling states of charge of multiple battery packs.

A system 1 for monitoring and remotely controlling respective states of charge of multiple battery packs 2, 3 is illustrated severely schematized in the single FIGURE. The two battery packs 2, 3 illustrated here comprise respective communication devices 4, 5, the functionality of which is later addressed. The one battery pack 2 is currently plugged into a charging device 6, wherein the other battery pack 3 is plugged into an electrical appliance 7. The electrical appliance 7 can be any electrical appliances.

For example, the electrical appliance 7 can be a hand tool in the form of a cordless screwdriver, a cordless drill, a cordless portable circular saw or the like. Further, the electrical appliance 7 can also be any battery-operated gardening tools, such as for example battery-operated garden vacuums, battery-operated grass shears, battery-operated scarifiers, battery-operated lawn mowers or the like. Just as well, the electrical appliance 7 can for example also be a battery-operated household appliance of any type. Basically, the electrical appliance 7 can be any types of electrical appliances, in which the battery packs 2, 3 can be employed.

In addition, a server device 8 and at least one user interface 9 also belong to the system 1. The user interface 9 can for example be formed by a smart phone app, which can be operated on any smart phones. In contrast to the present representation, the system 1 can also comprise any further such user interfaces 9, which can for example also be an app for a tablet computer, a browser-based graphical user interface and the like.

Both communication devices 4, 5 of the battery packs 2, 3 are configured to transmit very different data to the server device 8 via a Low Power Wide Area Network and to receive it from it. Therein, the communication devices 4, 5 can use very different standards or technologies for transmitting and receiving the data via the Low Power Wide Area Network, for example the following:

LoRaWAN;
Symphony Link;
LTE-M;
NarrowBand-IoT;
Weightless-N;
Weightless-P;
Weightless-W;
Wi-Fi HaLow;
WavIoT NarrowBand Fidelity;
SigFox;
Random Phase Multiple Access.

Preferably, the communication devices 4, 5 of the battery packs 2, 3 are additionally also configured to transfer the data via a Wireless Local Area Network and/or via a Bluetooth link in direct or also indirect manner—thus in this case with interposition of other appliances—to the server device 8.

The entire system 1 serves to monitor and remotely control respective states of charge of the battery packs 2, 3. Both communication devices 4, 5 of the battery packs 2, 3 are configured to transfer respective state of charge data of the battery packs 2, 3 to the sever device 8. The server device 8 is configured to transfer this state of charge data to the user interface 9 of the system 1. Thus, a user can for example recognize at his smart phone at any time on an app correspondingly serving as the user interface how the situation of the states of charge of the two battery packs 2, 3 is.

In addition, the user interface 9 offers the possibility that a user can remotely control the charging device 6. Thereto, the user interface 9 is configured to capture one or also more user inputs in this respect and to transfer control data for controlling the charging device 6 to the server device 8 depending thereon. The server device 8 in turn is configured to transfer this control data in turn—in the presently shown case—to the communication device 4 integrated in the battery pack 2. It is configured to transfer the control data for a charging operation of the battery pack to a control 10 of the charging device 6.

Thus, a user can remotely recognize in simple manner how the situation of the states of charge of the respective battery packs 2, 3 are per se on the one hand. In addition, he can remotely very simply activate the charging device 6 via the user interface 9 to charge the battery pack.

For example, if the electrical appliance 7 is a lawn mower, in which the battery packs 2, 3 can be used, thus, the user can examine for example still sitting at work based on browser or also via his smart phone using the user interface 9, how the situation of the states of charge of the respective battery packs 2, 3 is. In addition, it can also be provided that the server device 8 is configured to transfer a request for charging the battery packs 2, 3 to the user interface 9 depending on weather data, date entries in an electronic diary of the concerned person and the state of charge data of the battery packs 2, 3, which is configured to visualize this request. Thus, the user can be optimally assisted to ensure the suitable availability of the battery packs 2, 3 for the point of time when he actually wants to mow his lawn using the electrical appliance 7.

In addition, the communication devices 4, 5 can also be configured to transfer state data with respect to a temperature of the battery packs 2, 3 error memory entries of the battery packs 2, 3 and/or a respective state of health of the battery packs 2, 3 to the server device 8, which is configured to transfer the state data to the user interface 9, which then correspondingly visualizes this data.

In addition, in the presently shown case, the communication device 4 of the battery pack 2 can for example also capture a remaining charging time of the battery pack 2 and transfer corresponding data to the server device 8, which then in turn transfers this data to the user interface 9. Thus, the user can remotely view for example at his smart phone or at another suitable location, how long it still takes until the battery pack 2 is completely charged. Thus, the system 1 offers a very convenient and reliable possibility of remotely viewing very different data with respect to the battery packs 2, 3, in particular also with respect to their respective states of charge, and to initiate charging operations in remotely controlled manner. Thereby, a particularly high availability of the battery packs 2, 3 can be ensured.

In addition, it is also possible that the respective communication devices 4,5 of the battery packs 2, 3 are configured to transfer occupancy data with respect to an occupancy of the charging device 6 to the server device 8, which in turn transfers this data to the user interface 9. Thus, it is for example possible that the respective battery packs 2, 3 autonomously recognize if they are currently plugged into the charging device 6 and transfer this information to the server device 8 and thus finally also to the user interface 9. Alternatively or additionally, it is also possible that the charging device 6 itself comprises a corresponding communication device not illustrated in more detail here, which is configured to transfer its occupancy state with respect to the currently plugged-in battery packs 2, 3 to the server device 8 and thus also to the user interface 9. Thus, a user can either way remotely recognize at any time how many of his battery packs 2, 3 are currently plugged into his charging device 6. Thus, he can also recognize in simple manner how many of his battery packs 2, 3 he could remotely charge anyway.

Further, the respective communication devices 4, 5 of the battery packs 2, 3 can also be configured to transfer data with respect to a remaining operating time of the respective battery packs 2, 3 to the server device 8 and moreover also to the user interface 9. A user can then view via the user interface 9, how long he still can use the battery packs 2, 3 anyway without charging them before. Ideally, it is for example recorded on the server device 8, which types of electrical appliances the user has in employment anyway. In this case, it would be possible to also output different operating times for the respective electrical appliance types for the different battery packs 2, 3 by means of the user interface 9. According to which types of electrical appliances the user currently wants to employ, he can then decide based on this information if he should better once again already remotely charge his battery packs 2, 3.

Moreover, it is also possible that the server device 8 according to the example presented here is capable of transferring the state of charge data with respect to the battery pack 2 to the communication device 5 of the other battery pack 3, wherein it is configured to visualize the state of charge data, in particular to display if the battery pack 2 is fully charged. Thereto, the battery pack 3 (as well as the other battery pack 2) can comprise a display. Alternatively, it would for example also be possible that the battery packs 2, 3 simply only comprise a correspondingly suitable status lamp, which is illuminated for example either red, yellow or green, depending on how fully charged the other battery pack 2 or 3 currently is. Further, it would also be possible that the electrical appliance 7 comprises a corresponding display, which can display how the situation of the state of charge of the battery pack 2 plugged into the charging device 6 currently is.

Moreover, it is also possible that the server device 8 is configured to transfer control data for discharging and charging to the battery packs 2, 3, more exactly to their communication devices 4, 5, according to a presettable schedule. As soon as the battery packs 2, 3 are connected to the charging device 6, the communication devices 4, 5 of the battery packs 2, 3 transfer this control data in turn to the control 10 of the charging device 6, which then uses it for cyclically discharging and charging the battery packs 2, 3. Thereby, it is possible even upon longer non-use of the battery packs 2, 3, to leave them plugged in the charging device 6, wherein by cyclically and automatically discharging and charging the battery packs 2, 3, their lifetime and their performance can be increased. If the battery packs 2, 3 are for example mainly used for gardening tools, thus, it could occur that the battery packs 2, 3 are not used at all in the winter months. The battery packs 2, 3 could then remain plugged in the charging device 6 all the time during the winter months, wherein the server device 8 ensures that the battery packs 2, 3 are slightly discharged and charged from time to time, namely such that the state of health of the battery packs 2, 3 remains at a level as high as possible.

Thus, the system 1 and the corresponding method for monitoring and remotely controlling the states of charge of the battery packs 2, 3 using the system 1 contribute to the fact that the availability of battery packs 2, 3 can also be remotely ensured by a user in particularly simple manner in that corresponding information with respect to the battery packs 2, 3 is provided by means of the user interface 9 and additionally charging operations with respect to the battery packs 2, 3 are also allowed in remotely controlled manner via the user interface 9.

LIST OF REFERENCE CHARACTERS

1 System
2 battery pack
3 communication device of the battery pack
4 further battery pack
5 communication device of the further battery pack
6 charging device
7 electrical appliance
8 server device
9 user interface
10 control

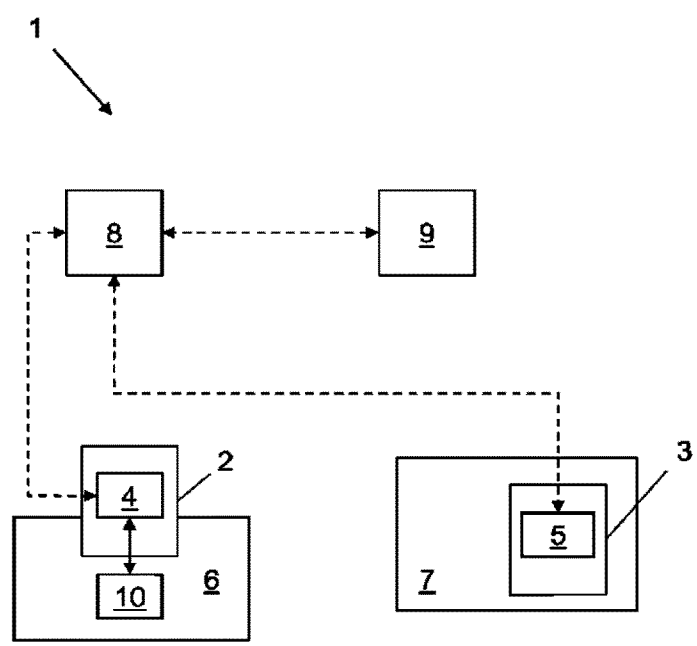

The invention claimed is:

1. A system for monitoring and remotely controlling a state of charge of at least one battery pack comprising:
at least one battery pack for a gardening tool or a hand tool, the battery pack comprising a communication device, which is configured to transfer state of charge data of the battery pack to a server device of the system, which is configured to transfer the state of charge data to at least one user interface of the system, which is configured to visualize the state of charge data of the battery pack,
wherein the user interface is additionally configured to transfer control data for controlling a charging device to the server device depending on a user input, which is configured to transfer the control data to the communication device integrated in the battery pack, which is configured to transfer the control data for a charging operation of the battery pack to the charging device,
wherein the server device transfers a request for charging the battery pack to the user interface depending on date entries in an electronic diary of a person, which is configured to visualize this request.

2. The system according to claim 1,
wherein the communication device of the battery pack is configured to transmit the data to the server device via a Low Power Wide Area Network and to receive it from it.

3. The system according to claim 2,
wherein the communication device is configured to use at least one of the following standards or technologies for transmitting and receiving the data via the Low Power Wide Area Network:
LoRaWAN;
Symphony Link;
LTE-M;
NarrowBand-IoT;
Weightless-N;
Weightless-P;
Weightless-W;
Wi-Fi HaLow;
WavIoT NarrowBand Fidelity;
SigFox;
Random Phase Multiple Access.

4. The system according to claim 1,
wherein the communication device of the battery pack is additionally configured to transmit and/or receive the data and/or other data via a Wireless Local Area Network and/or via a Bluetooth link.

5. The system according to claim 1,
wherein the communication device of the battery pack is configured to transfer state data with respect to a temperature of the battery pack, error memory entries of the battery pack and/or a state of health of the battery pack to the server device, which is configured to transfer the state data to the user interface, which is configured to visualize the data.

6. The system according to claim 5,
wherein the server device is configured to transfer a request for charging the battery pack to the user interface depending on the state of charge data of the battery pack and/or the state data, which is configured to visualize this request.

7. The system according to claim 1,
wherein the server device is configured to transfer a request for charging the battery pack to the user interface depending on weather data, which is configured to visualize this request.

8. The system according to claim 1,
wherein the user interface is formed in the form of an app for a mobile terminal.

9. The system according to claim 1,
wherein the user interface or a further user interface is formed in the form of a graphic user interface for a web browser.

10. The system according to claim 1,
wherein the communication device is configured to transfer data with respect to a remaining charging time of the battery pack to the server device, which is configured to transfer the data to the user interface, which is configured to visualize the remaining charging time based on the data.

11. The system according to claim 1,
wherein the communication device is configured to transfer occupancy data with respect to an occupancy of the charging device to the server device, which is configured to transfer the occupancy data to the user interface, which is configured to visualize based on the occupancy data, how many battery packs are arranged in the charging device.

12. The system according to claim 1,
wherein the communication device is configured to transfer data with respect to a remaining operating time of the battery pack to the server device, which is configured to transfer the data to the user interface, which is configured to visualize the remaining operating time based on the data.

13. The system according to claim 1,
wherein the server device is configured to transfer control data for discharging and charging the battery pack to the communication device integrated in the battery pack according a presettable schedule, which is configured to transfer this control data for a discharging and charging operation of the battery pack to the charging device.

14. The system according to claim 1,
wherein the server device is configured to transfer the state of charge data to a communication device of a further battery pack, which is configured to visualize the state of charge data.

15. A method for monitoring and remotely controlling a state of charge of at least one battery pack comprising:
- by a communication device, transferring state of charge data of a battery pack for a gardening tool or a hand tool to a server device, which transfers the state of charge data to a user interface, which visualizes the state of charge data of the battery pack;
- by the user interface, transferring control data for controlling a charging device to the server device depending on a user input, which transfers the control data to the communication device integrated in the battery pack, which transfers the control data for a charging operation of the battery pack to the charging device, by the server device, transferring a request for charging the battery pack to the user interface depending on date entries in an electronic diary of a person, which visualizes this request.

* * * * *

UNITED STATES PATENT AND TRADEMARK OFFICE
CERTIFICATE OF CORRECTION

PATENT NO. : 11,050,265 B2
APPLICATION NO. : 16/649849
DATED : June 29, 2021
INVENTOR(S) : Markus Thannhuber It is certified that error appears in the above-identified patent and that said Letters Patent is hereby corrected as shown below:

On the Title Page

At the bottom of the ABSTRACT, delete "15 Claims, No Drawings" and insert --15 Claims, 1 Drawing Sheet--.

At the bottom of the page, insert Fig. 1, as shown on the attached drawing sheet.

In the Drawings

See the attached drawing sheet showing Fig. 1.

Signed and Sealed this
Fifth Day of April, 2022

Drew Hirshfeld
*Performing the Functions and Duties of the
Under Secretary of Commerce for Intellectual Property and
Director of the United States Patent and Trademark Office*